(12) United States Patent
Hutton et al.

(10) Patent No.: US 7,603,736 B2
(45) Date of Patent: Oct. 20, 2009

(54) METHOD FOR ALIGNING A PLURALITY OF PASSENGER BOARDING BRIDGES

(75) Inventors: Neil Hutton, Ottawa (CA); Roland Fischer, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 683 days.

(21) Appl. No.: 11/378,306

(22) Filed: Mar. 20, 2006

(65) Prior Publication Data

US 2007/0214585 A1    Sep. 20, 2007

(51) Int. Cl.
    *E01D 1/00*    (2006.01)
(52) U.S. Cl. ......................... 14/71.5; 340/958
(58) Field of Classification Search ................. 404/71.5; 340/958
    See application file for complete search history.

(56) References Cited

U.S. PATENT DOCUMENTS

| | | | | |
|---|---|---|---|---|
| 2,875,457 | A * | 3/1959 | Read et al. | 14/71.5 |
| 3,524,207 | A * | 8/1970 | Giarretto | 14/71.5 |
| 3,538,529 | A * | 11/1970 | Breier | 14/71.5 |
| 3,722,017 | A * | 3/1973 | Gacs et al. | 14/71.5 |
| 3,724,015 | A * | 4/1973 | Japes | 104/71 |
| 3,728,754 | A * | 4/1973 | Lodjic | 14/71.5 |
| 3,839,760 | A * | 10/1974 | Nagy | 14/71.5 |
| 5,226,204 | A | 7/1993 | Schoenberger et al. | |
| 6,496,996 | B1 * | 12/2002 | Worpenberg et al. | 14/71.5 |
| 6,526,615 | B1 | 3/2003 | Hutton et al. | |
| 6,637,063 | B1 | 10/2003 | Hutton et al. | |
| 6,724,314 | B2 | 4/2004 | Hutton | |
| 6,742,210 | B2 | 6/2004 | Hutton et al. | |
| 6,757,927 | B2 | 7/2004 | Hutton et al. | |
| 6,789,286 | B1 | 9/2004 | Hutton et al. | |
| 6,820,296 | B2 | 11/2004 | Hutton et al. | |
| 6,907,635 | B2 | 6/2005 | Hutton et al. | |
| 6,931,687 | B2 | 8/2005 | Hutton et al. | |
| 7,039,978 | B2 | 5/2006 | Hutton | |
| 7,093,314 | B2 | 8/2006 | Hutton et al. | |

(Continued)

OTHER PUBLICATIONS

U.S. Appl. No. 11/589,737, Hutton.

*Primary Examiner*—Raymond W Addie
(74) *Attorney, Agent, or Firm*—Freedman & Associates

(57) ABSTRACT

A system is provided for aligning a first passenger boarding bridge tunnel section with a first doorway of an aircraft and for aligning a second passenger boarding bridge tunnel section with a second doorway of the aircraft includes. The system includes a sensor for sensing an orientation of a first passenger boarding bridge tunnel section when it is in an aligned condition with a first doorway of the aircraft, and for sensing an orientation of a second passenger boarding bridge tunnel section when it is in other than an aligned condition with the second doorway of the aircraft. The sensor is in communication with a controller. The controller is for receiving a signal from the sensor, and for determining the orientation of the first passenger boarding bridge tunnel section and the orientation of the second passenger boarding bridge tunnel section in dependence upon the signal. Based upon the determined orientation information, as well as stored information relating to a location of the second doorway relative to the first doorway, the controller determines a movement for moving the second passenger boarding bridge tunnel section into an aligned condition with the second doorway of the aircraft.

36 Claims, 5 Drawing Sheets

U.S. PATENT DOCUMENTS

| | | | |
|---|---|---|---|
| 7,137,162 | B2 | 11/2006 | Spencer et al. |
| 2006/0277699 | A1 | 12/2006 | Hutton |
| 2006/0287780 | A1 | 12/2006 | Hutton |
| 2006/0288502 | A1 | 12/2006 | Hutton |
| 2006/0288503 | A1 | 12/2006 | Hutton |
| 2007/0214584 | A1 | 9/2007 | Hutton |

* cited by examiner

METHOD FOR ALIGNING A PLURALITY OF PASSENGER BOARDING BRIDGES

FIELD OF THE INVENTION

The instant invention relates generally to passenger boarding bridges, and more particularly to methods for aligning a plurality of passenger boarding bridges with a plurality of different doorways of an aircraft.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge in present day use includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. Manual, semi-automated and fully-automated bridge alignment systems are known for adjusting the position of the passenger boarding bridge relative to an aircraft, to compensate for different sized aircraft and to compensate for imprecise parking of aircraft.

A manual bridge alignment system requires that a human operator is present to perform the alignment operation each time an aircraft arrives. Delays occur when the human operator is not standing-by to perform the alignment operation as soon as the aircraft comes to a stop. In addition, human operators are prone to errors that result in the passenger boarding bridge being driven into the aircraft or into a piece of ground service equipment. Such collisions involving the passenger boarding bridge are costly and also result in delays. In order to avoid causing a collision, human operators tend to err on the side of caution and drive the bridge slowly and cautiously.

Semi-automated bridge alignment systems also require a human operator, but the human operator may be present at a remote location and interact with the bridge control system in a tele-robotic manner. One human operator may interact with a plurality of different passenger boarding bridges, thereby reducing the costs associated with training and paying the salaries of human operators. Alternatively, certain movements of the bridge are automated, whilst other movements are performed under the control of the human operator.

Automated bridge alignment systems provide a number of advantages compared to manual and semi-automated systems. For instance, automated bridge alignment systems do not require a human operator, and therefore the costs that are associated with training and paying the salaries of human operators are reduced or eliminated. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft travel.

In some instances, it is desirable to align a plurality of passenger boarding bridge tunnel sections with a plurality of different doorways of an aircraft. For instance, a dual boarding bridge includes a front tunnel section for being aligned with a doorway that is forward of the wing of the aircraft and an over-the-wing (OTW) tunnel section for being aligned with a doorway that is above or aft of the wing of the aircraft. Optionally, the front tunnel section is one of an apron drive bridge, a radial drive bridge and a nose-loader bridge. Transferring passengers simultaneously via the front tunnel section and the over-the-wing tunnel section results in shorter aircraft turnaround times, since it is the aircraft doorway that most significantly limits passenger flow. Typically, OTW bridges are used only with narrow body aircraft. However, similar results are obtained with wide body aircraft by aligning a plurality of tunnel sections with a plurality of different doorways that are forward of the wing of the aircraft. In each case, more than one passenger boarding bridge tunnel section is moved from an initial or stowed position to a position in which the tunnel section is aligned with a desired one of the plurality of different doorways of the aircraft.

Not all types of bridge alignment systems are well suited for aligning a plurality of passenger boarding bridge tunnel sections to doorways of an aircraft. In particular, a manual or semi-automated bridge alignment system either requires a plurality of human operators, or a single bridge operator must align each tunnel section in sequence. Of course, salaries and training costs escalate when plural bridge operators are employed. Furthermore, one inexperienced bridge operator may limit the overall efficiency of turning around the aircraft. In addition, it may be quicker to move passengers through only one doorway of the aircraft rather than to wait for a single bridge operator to align several different tunnel sections, one at a time.

Automated bridge alignment systems overcome some of the problems that are associated with manual and semi-automated systems. However, it is very costly to equip each different passenger boarding bridge tunnel section with a separate bridge controller, including the associated sensors, safety equipment, communications equipment, etc. Furthermore, when servicing a plurality of doorways that are forward of the wing of an aircraft, the passenger boarding bridge tunnel sections are close together and the risk of collision is increased. In addition, if one or more of the plurality of passenger boarding bridge tunnel sections is not aligned successfully, then it is necessary to call for a human bridge operator to complete the alignment process. This delay in aligning some of the tunnel sections may cause confusion inside the aircraft, since the flight attendants will realize only at the last minute that some exits are unavailable, and the passengers will require new instructions to either wait for the doorway to open, or to move toward another exit.

It would be advantageous to provide a method for aligning plural passenger boarding bridge tunnel sections with a plurality of doorways of an aircraft, which overcomes at least some of the above-mentioned limitations of the prior art. It would be further advantageous to provide a method that is applicable to operation of dual-bridges or multi-bridges of the over-the-wing type, as well as to operation of a plurality of separate passenger boarding bridges.

SUMMARY OF EMBODIMENTS OF THE INVENTION

It is an object of at least one embodiment of the instant invention to provide a method for aligning a plurality of passenger boarding bridge tunnel sections with a plurality of doorways of an aircraft.

In accordance with an aspect of the instant invention there is provided a method for aligning a first passenger boarding bridge tunnel section with a first doorway of an aircraft and for aligning a second passenger boarding bridge tunnel section with a second doorway of the aircraft, the method comprising: providing a controller in communication with the first passenger boarding bridge tunnel section, with the second passenger boarding bridge tunnel section, and with a memory element having stored therein information relating to a location of the second doorway relative to the first doorway; using the controller, automatically aligning the first passenger boarding bridge tunnel section with the first doorway; determining a current orientation of the second passenger boarding bridge tunnel section relative to the aligned first passenger boarding bridge tunnel section; retrieving the information relating to the location of the second doorway relative to the first doorway; based upon the determined current orientation and the retrieved information, determining a movement for aligning the second passenger boarding bridge tunnel section with the second doorway; and, using the controller, automatically performing the determined movement, so as to align the second passenger boarding bridge tunnel section with the second doorway.

In accordance with another aspect of the instant invention there is provided a method for aligning in a one-to-one fashion, a plurality of passenger boarding bridge tunnel sections with a plurality of doorways of an aircraft, the method comprising: aligning a first tunnel section of the plurality of passenger boarding bridge tunnel sections with a first doorway of the plurality of doorways; determining a current orientation of a second tunnel section of the plurality of passenger boarding bridge tunnel sections relative to the aligned first tunnel section; retrieving stored information relating to a location of a second doorway of the plurality of doorways relative to the first doorway; based upon the determined current orientation and the retrieved stored information, determining a movement for positioning the second tunnel section adjacent to the second doorway; and, performing the determined movement in an automated fashion, so as to position the second tunnel section adjacent to the second doorway.

In accordance with still another aspect of the instant invention there is provided a method for aligning a first passenger boarding bridge tunnel section with a first doorway of an aircraft and for aligning a second passenger boarding bridge tunnel section with a second doorway of the aircraft, the method comprising: aligning the first passenger boarding bridge tunnel section with the first doorway; using sensors that are disposed along the first passenger boarding bridge tunnel section, determining an alignment position of the first passenger boarding bridge tunnel section relative to a known reference position; and, based on the determined alignment position of the first passenger boarding bridge tunnel section, automatically positioning the second passenger boarding bridge tunnel section adjacent to the second doorway.

In accordance with still another aspect of the instant invention there is provided a system for aligning a first passenger boarding bridge tunnel section with a first doorway of an aircraft and for aligning a second passenger boarding bridge tunnel section with a second doorway of the aircraft, the system comprising: a sensor for sensing an orientation of the first passenger boarding bridge tunnel section when in an aligned condition with the first doorway of the aircraft and for sensing an orientation of the second passenger boarding bridge tunnel section when in other than an aligned condition with the second doorway of the aircraft; a controller in communication with the sensor, for receiving a signal therefrom, and for determining the orientation of the first passenger boarding bridge tunnel section and the orientation of the second passenger boarding bridge tunnel section in dependence upon the signal; and, a memory element in communication with the controller for retrievably storing information relating to a location of the second doorway relative to the first doorway.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1A:
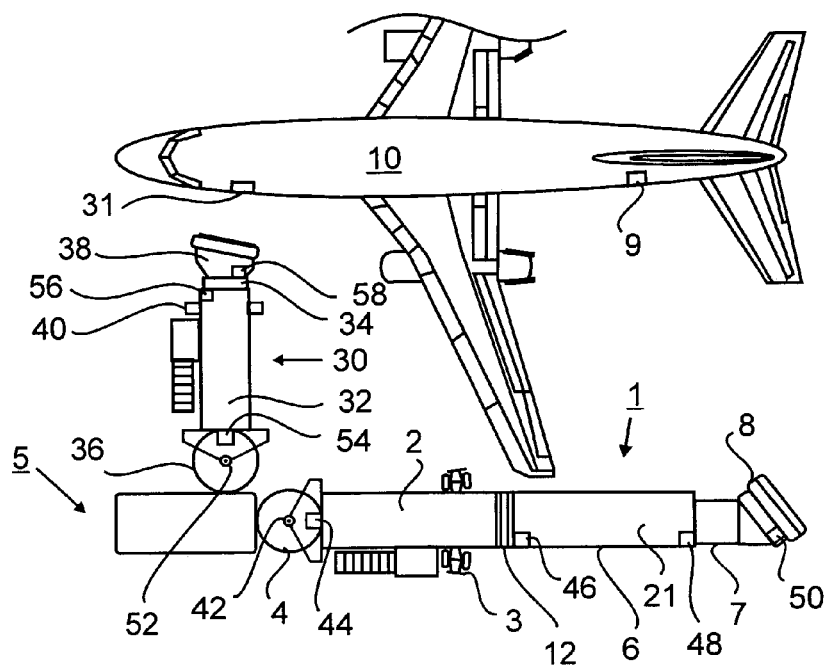
FIG. 1a is a simplified top view of a dual boarding bridge including an over-the-wing (OTW) portion and a radial drive portion, the dual boarding bridge in a stowed position relative to a nose-in parked aircraft.

Referring to FIG. 1a, shown is a simplified top view of a dual boarding bridge in a stowed position relative to a nose-in parked aircraft. The dual boarding bridge includes a first rotunda 4 from which extends a first tunnel section 1 ending with a pivotal cabin 8 for engaging a rear doorway 9 of an aircraft 10. The first tunnel section 1 includes a fixed-length member 2 and a telescopic member 21. The fixed-length member 2 includes a floor, two sidewalls and a ceiling. The telescopic member 21 includes outer and inner tunnel elements 6 and 7, wherein the inner element 7 is telescopically received within the outer element 6 such that the length of the telescopic member 21 is variable. Each tunnel element 6 and 7 includes a floor, two sidewalls and a ceiling. Preferably, the fixed-length member 2 and the outer tunnel element 6 have substantially similar cross-sectional profiles when viewed end-on. A bellows-type canopy 12 and a not illustrated floor connector connect the outboard end of the fixed-length member 2 and the inboard end of the outer tunnel element 6. The bellows-type canopy 12 is provided between the fixed-length member 2 and the outer tunnel element 6 to provide weatherproof protection to passengers moving therethrough. The floor connector supports vertical swinging of the telescopic member 21 about a horizontal axis passing through the floor connector. Optionally, a floor plate (not shown) is provided to give a level walking-surface above the floor connector.

The fixed-length member 2 is supported near the outboard end thereof by a wheel carriage including height adjustable support posts and drive wheels 3. The drive wheels 3 are for achieving angular displacement of the first tunnel section 1. Additional mechanisms (not shown) are provided for slidingly extending and retracting the inner tunnel element 7 relative to the outer tunnel element 6, to thereby affect the length of the first tunnel section 1, and for pivoting the pivotal cabin 8. The height adjustable support posts preferably include one of a hydraulic cylinder, a pneumatic cylinder and a screw jack.

As is shown in FIG. 1*a*, the first rotunda 4 opens onto a stationary bridge structure 5 leading to a terminal building (not shown). A second rotunda 36 is provided adjacent to and opens onto the stationary bridge structure 5. Extending from the second rotunda 36 is a second passenger boarding bridge tunnel section 30, for servicing a front doorway 31 of the aircraft 10. Optionally, the second passenger boarding bridge tunnel section 30 is provided in the form of a nose-loader type bridge, a radial bridge, or an apron drive bridge. In the specific example that is shown in FIG. 1*a*, the second passenger boarding bridge tunnel section 30 is a radial drive bridge, including outer and inner tunnel elements 32 and 34, wherein the inner element 34 is telescopically received within the outer element 32 such that the length of the tunnel section 30 is variable. Each tunnel element 32 and 34 includes a floor, two sidewalls and a ceiling. A pivotal cabin 38 is provided at the outboard end of tunnel section 30 for engaging the front doorway 31 of the aircraft 10. The second passenger boarding bridge tunnel section 30 is suspended from a frame 40 for adjusting the height of tunnel section 30. The frame 40 is mounted to a not illustrated wheel carriage including drive wheels for achieving angular displacement of the second tunnel section 30. Additional mechanisms (not shown) are provided for slidingly extending and retracting the inner tunnel element 34 relative to the outer tunnel element 32, to thereby affect the length of the second tunnel section 30, and for pivoting the pivotal cabin 38.

According to an embodiment of the instant invention, a first plurality of transducers including transducers 42, 44, 46, 48 and 50 are disposed along the first tunnel section 1, and a second plurality of transducers including transducers 52, 54, 56 and 58 are disposed along the second tunnel section 30. The first plurality of transducers sense the angular position of the first tunnel section 1, the height of the first tunnel section 1, the relative positions of the fixed-length member 2 and the telescopic member 21, the relative positions of the inner tunnel element 7 and the outer tunnel element 6, and the angular position of the cabin 8. Similarly, the second plurality of transducers sense the angular position of the second tunnel section 30, the height of the second tunnel section 30, the relative positions of the inner tunnel element 34 and the outer tunnel element 32, and the angular position of the cabin 38. Of course, other types of transducers and/or other numbers of transducers and/or other locations of transducers are optionally used to determine the positions of the first tunnel section 1 and the second tunnel section 30. For instance optionally a laser, such as for instance an infrared laser, is mounted on the roofs of pivotal cabins 8 and 38, and at least two reflectors are mounted at different locations on or about the terminal building. By sweeping the lasers, measuring the distance to the reflectors with the aid of the lasers, and determining the angular position of the lasers when directed toward the reflectors, the position of the first tunnel section 1 and the second tunnel section 30 may be determined. Optionally a laser, such as for instance an infrared laser, is mounted on the roof of one of pivotal cabins 8 and 38, and one or more reflector is mounted on the roof of the other one of pivotal cabins 8 and 38. The position of pivotal cabin 8 relative to the position of pivotal cabin 38 may be determined in a manner analogous to that described supra. Of course, lasers that operate in regions of the electromagnetic spectrum other than the infrared region may also be used. Further optionally, other types of sensors such as for instance echo sonography sensors are used to determine the positions of the first tunnel section 1 and the second tunnel section 30. Of course, combinations of the different types of sensors also are envisaged for determining the positions of the first tunnel section 1 and the second tunnel section 30.

Referring again to FIG. 1*a*, the first plurality of transducers and the second plurality of transducers are in communication with a not illustrated controller. For instance, the not illustrated controller is a controller of an automated bridge alignment system, including a processor and a memory storage element. Optionally, the controller is disposed aboard the first tunnel section 1 or the second tunnel section 30, or is disposed at a location remote from the dual boarding bridge. The memory storage element is for storing information relating to automated docking operations, such as for instance location data for the rear doorway 9 relative to the forward doorway 31. Optionally, location data is stored for doorways of each of a plurality of different aircraft sub-types. Further optionally, relative location data for more than two doorways is stored for some sub-types of aircraft. The processor is for processing data that is received from the second plurality of transducers to determine a current orientation of the second tunnel section 30. For instance, the processor determines an aligned orientation when the second tunnel section is in an aligned relationship with the forward doorway 31. In one implementation, the aligned orientation is determined relative to the first tunnel section 1. Optionally, the aligned orientation is determined relative to a known reference point or group of reference points. Similarly, the processor is for processing data that is received from the first plurality of transducers to determine a current orientation of the first tunnel section 1. For instance, the processor determines a stowed orientation when the first tunnel section is in the stowed position relative to the nose-in parked aircraft. Using doorway location data retrieved from the memory storage element, as well as the determined aligned orientation of the second tunnel section 30 and the stowed orientation of the first tunnel section 1, the processor determines a movement for aligning the first tunnel section 1 with the rear doorway of the aircraft.

Figure 1B:
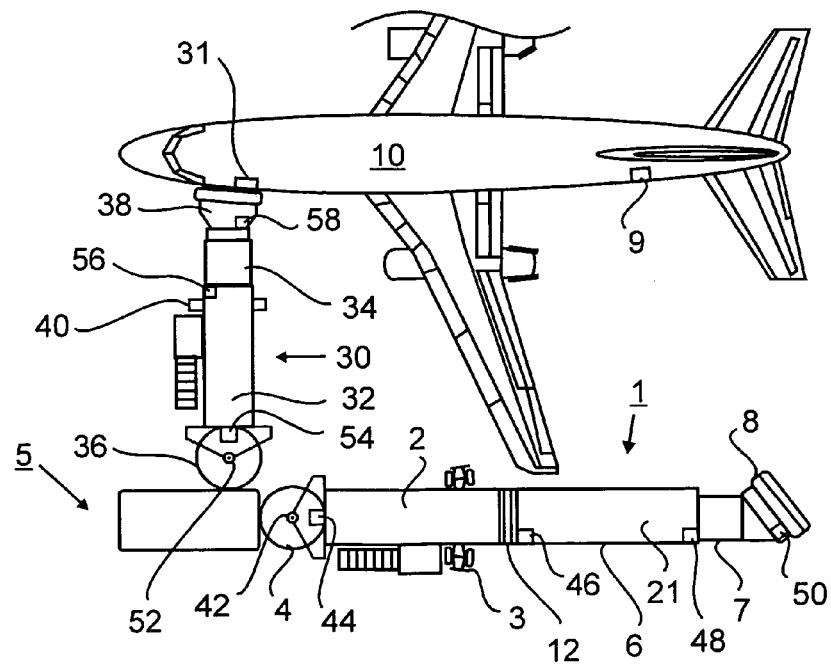
FIG. 1b is a simplified top view of a dual boarding bridge, with the pivotal cabin at the end of a second tunnel section aligned with a front doorway of an aircraft, and with a first tunnel section in a stowed position relative to the nose-in parked aircraft.

Referring now to FIG. 1*b*, shown is a simplified top view of the dual boarding bridge, with the pivotal cabin 38 at the end of the second tunnel section 30 aligned with the front doorway 31 of the aircraft, and with the first tunnel section 1 in a stowed position relative to the nose-in parked aircraft 10. Elements labeled with the same numerals have the same function as those illustrated in FIG. 1*a*.

Figure 1C:
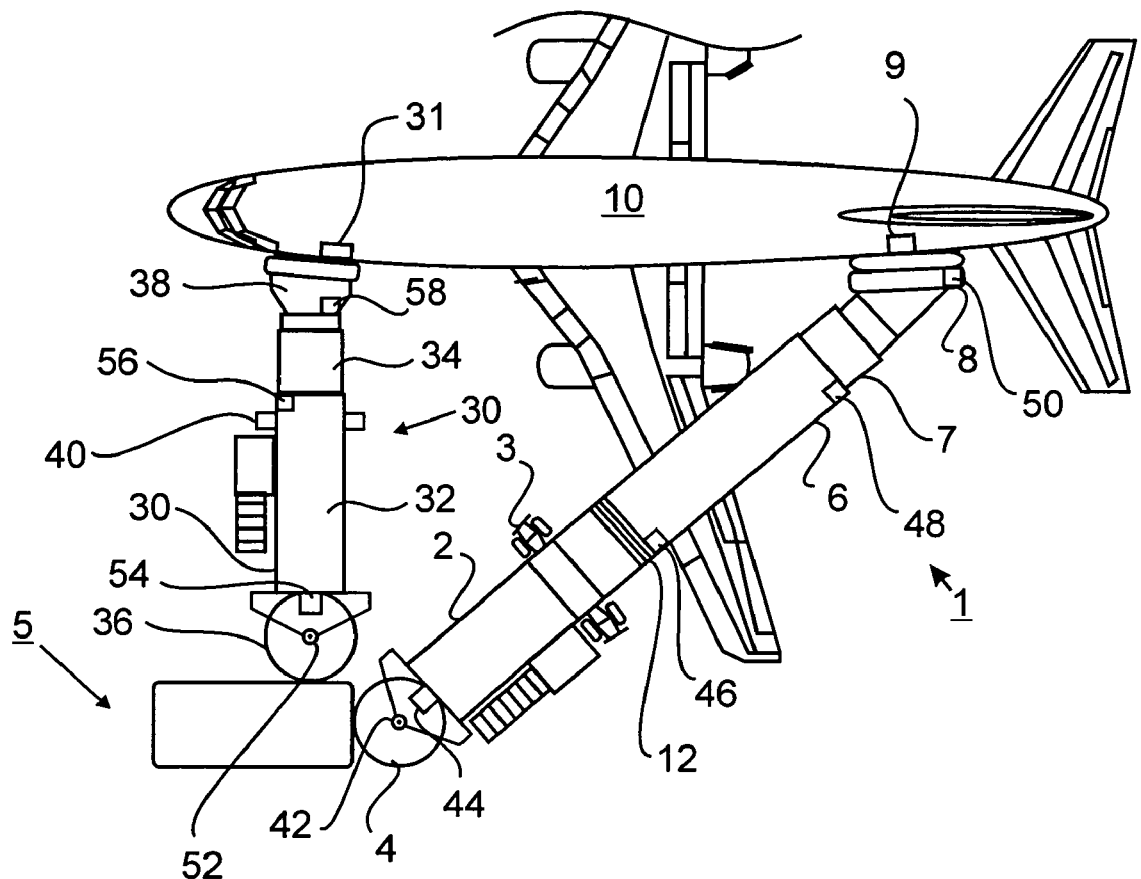
FIG. 1c is a simplified top view of a dual boarding bridge, with the pivotal cabin at the end of a second tunnel section aligned with a front doorway of an aircraft, and with the pivotal cabin at the end of a first tunnel section aligned with a rear doorway of the aircraft.

Referring now to FIG. 1*c*, shown is a simplified top view of the dual boarding bridge, with the pivotal cabin 38 at the end of the second tunnel section 30 aligned with the front doorway 31 of the aircraft, and with the pivotal cabin 8 at the end of the first tunnel section 1 aligned with the rear doorway 9 of the aircraft. Elements labeled with the same numerals have the same function as those illustrated in FIG. 1*a*.

Referring again to FIG. 1*a*, the dual boarding bridge is shown prior to being aligned with doorways of aircraft 10. For instance, aircraft 10 has just completed parking within a space that is adjacent to the dual boarding bridge, and the alignment operation is about to commence. According to the instant embodiment, the second tunnel section 30 is maneuvered from the stowed position that is illustrated in FIG. 1a into the aircraft engaging position that is illustrated in FIG. 1b. It is preferred that the second tunnel section 30 is maneuvered under the control of an automated bridge alignment controller. Optionally, the second tunnel section 30 is aligned with the forward doorway 31 manually or in a semi-automated manner. For instance, failure of the automated bridge alignment system to perform a successful alignment may result in a human bridge operator being called to manually complete the alignment operation.

Once the second tunnel section is in the aligned orientation as shown in FIG. 1b, signals are provided from each of the second plurality of transducers. The signals are received by a controller and used to determine the aligned orientation of the second tunnel section 30. Similarly, signals are provided from each of the first plurality of transducers to the controller, and the controller determines the stowed orientation of the first tunnel section 1. Optionally, the stowed orientation is predefined, such that it is not necessary each time to determine the stowed orientation of the first tunnel section 1. Further optionally, the determined orientation relates to a pre-position of the first tunnel section 1, which is close to the expected stopping position of the rear doorway 9. Doorway location data specific to the sub-type of aircraft 10 is retrieved from the memory storage element. Accordingly, the sub-type of aircraft 10 is known in advance or is determined when aircraft 10 parks within the space adjacent to the dual bridge. Since the pivotal cabin 38 is engaging the forward doorway 31, it is known that the pivotal cabin 38 and the forward doorway 31 are at the same position. The location of the rear doorway 9 is known relative to this position, as is the pivotal cabin 8 of the first tunnel section 1. Accordingly, the location of the pivotal cabin 8 relative to the rear doorway 9 may be derived precisely. The controller determines a movement for moving automatically the first tunnel section 1 from the stowed position that is illustrated in FIG. 1b into the aircraft engaging position that is illustrated in FIG. 1c. The first tunnel section 1 is then moved from the stowed position that is illustrated in FIG. 1b into the aircraft engaging position that is illustrated in FIG. 1c, in an automated manner under the control of the controller. Advantageously, movement of the first tunnel section 1 is rapid and safe, since it is known precisely where the rear doorway 9 is relative to the first tunnel section 1. Further advantageously, one controller controls both the first tunnel section 1 and the second tunnel section 30.

Optionally, the controller determines a movement for moving automatically the first tunnel section 1 from the stowed position that is illustrated in FIG. 1b into a not illustrated pseudo-aligned position. For instance, the pivotal cabin 8 is aligned with the rear doorway both vertically and laterally, but is spaced-apart from the aircraft fuselage by a predetermined distance. Advantageously, the first tunnel section 1 may be moved very rapidly to the pseudo-aligned position since the risk of colliding with the aircraft 10 is low. The final distance is closed optionally using inductive sensors or pressure sensors to sense contact with the aircraft. Further optionally, a new orientation of the first tunnel section 1 relative to the aligned second tunnel section 30 is made, and a new movement is determined for closing the final distance to the rear doorway 9 of aircraft 10.

As is shown in FIG. 1c, the determined movement takes the first tunnel section 1 over the wing surface of aircraft 10 by driving the drive wheels 3 along an arcuate path in front of the wing and in a direction generally toward the aircraft. Such a movement involves considerable risk, as the potential for damaging one or both of the aircraft and the first tunnel section 1 very real. Furthermore, some sub-types of aircraft include winglets that are attached proximate a tip of the wing of the aircraft. Said winglets extend substantially above the highest point of the upper surface of the wing. For this reason optionally a sensor (not shown), preferably a plurality of sensors, including but not limited to laser range finders, echo sonography sensors, inductive proximity sensors, etc. is disposed along the first tunnel section 1 in order to sense critical distances, such as for example a distance between an aircraft component and the first tunnel section 1. In response to a sensor sensing an approach of the first tunnel section 1 to within a predetermined threshold value, the sensor transmits a control signal to the controller for initiating a corrective action, such as for instance one of moving the first tunnel section 1 away from the aircraft and stopping the motion of the first tunnel section 1. Of course, once the cabin 8 engages the rear doorway 9, the sensors continue to monitor critical distances as the aircraft is loaded and/or unloaded. Accordingly, the sensors also transmit automatic control signals for adjusting the relative positions of the tunnel segments as the aircraft raises and lowers during the above-mentioned operations, a function known as autoleveling.

The dual boarding bridge shown in FIGS. 1a-1c is presented as a specific and non-limiting example. In general, the instant invention is suitable for use with other arrangements in which a plurality of passenger boarding bridge tunnel sections are to be aligned with a plurality of doorways along one or more sides of an aircraft. To this end, a system for aligning a plurality of passenger boarding bridge tunnel sections includes sensing means for sensing orientations of the plurality of passenger boarding bridge tunnel sections, and a controller in communication with the sensing means for performing the orientation determinations, and for automatically aligning the passenger boarding bridge tunnel sections based upon the determined orientations and relative aircraft doorway information. The sensing means optionally is a plurality of sensors or transducers disposed along each of the passenger boarding bridge tunnel sections, or other sensors such as laser emitters/detectors and/or reflective surfaces, for determining distance and angle information of portions of each passenger boarding bridge tunnel section relative to other tunnel sections, or relative to external reference points. Preferably, one controller aligns all of the passenger boarding bridge tunnel sections. Of course, if more than two passenger boarding bridge tunnel sections are to be aligned, then optionally the controller determines movements for aligning two or more passenger boarding bridges during a same period of time, subsequent to a first one of the passenger boarding bridge tunnel sections being aligned. In other words, it is most efficient to align one passenger boarding bridge tunnel section, determine movements for aligning all of the remaining passenger boarding bridge tunnel sections, and then aligning simultaneously all of the remaining passenger boarding bridge tunnel sections.

Figure 2:
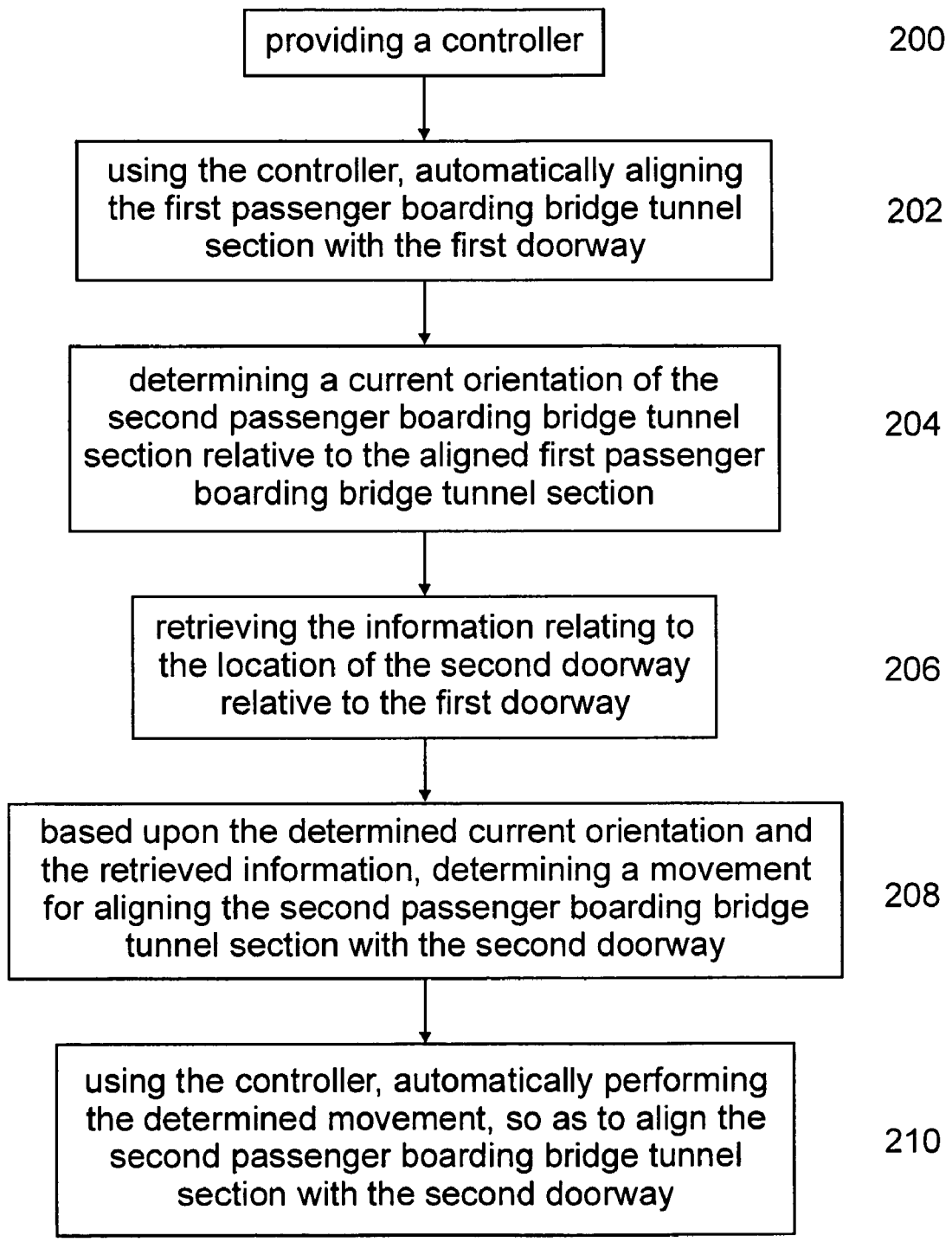
FIG. 2 is a simplified flow diagram of a method for aligning a plurality of passenger boarding bridge tunnel sections with a plurality of doorways of an aircraft.

Referring now to FIG. 2, shown is a simplified flow diagram of a method for aligning a plurality of passenger boarding bridge tunnel sections with a plurality of doorways of an aircraft. At step 200 a controller is provided in communication with the first passenger boarding bridge tunnel section, with the second passenger boarding bridge tunnel section, and with a memory element having stored therein information relating to a location of the second doorway relative to the first doorway. At step 202, using the controller, the first passenger boarding bridge tunnel section is automatically aligned with the first doorway. At step 204 a current orientation of the second passenger boarding bridge tunnel section is determined relative to the aligned first passenger boarding bridge tunnel section. At step 206 the information relating to the location of the second doorway relative to the first doorway is retrieved from the memory element. At step 208, based upon the determined current orientation and the retrieved information, a movement is determined for aligning the second passenger boarding bridge tunnel section with the second doorway. At step 210, using the controller, the determined movement is automatically performed, so as to align the second passenger boarding bridge tunnel section with the second doorway.

Figure 3:
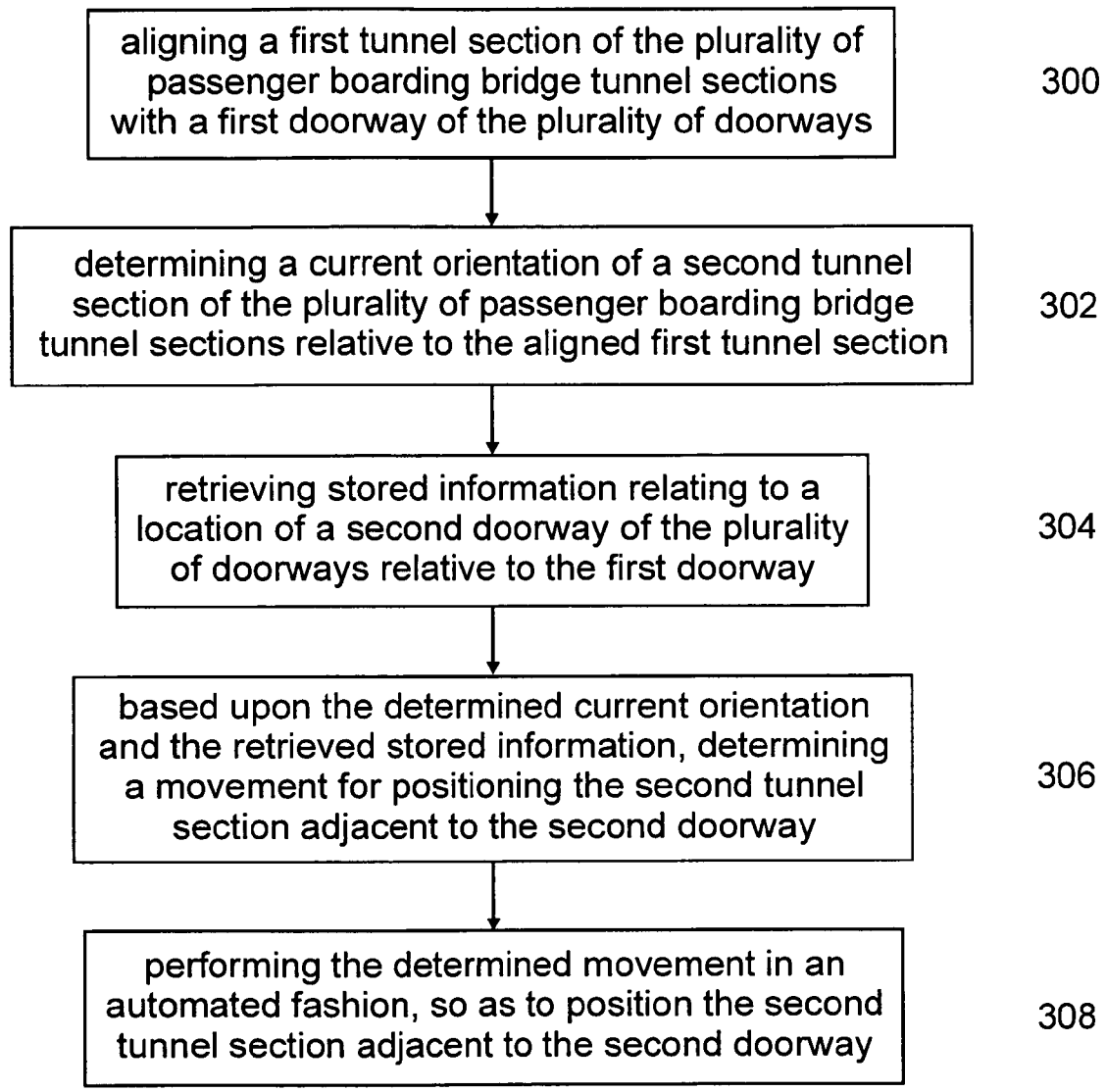
FIG. 3 is a simplified flow diagram of a method for aligning a plurality of passenger boarding bridge tunnel sections with a plurality of doorways of an aircraft; and, FIG. 4 is a simplified flow diagram of a method for aligning a plurality of passenger boarding bridge tunnel sections with a plurality of doorways of an aircraft.

Referring now to FIG. 3, shown is a simplified flow diagram of another method for aligning a plurality of passenger boarding bridge tunnel sections with a plurality of doorways of an aircraft. At step 300 a first tunnel section of the plurality of passenger boarding bridge tunnel sections is aligned with a first doorway of the plurality of doorways. At step 302 a current orientation of a second tunnel section of the plurality of passenger boarding bridge tunnel sections is determined relative to the aligned first tunnel section. At step 304 stored information relating to a location of a second doorway of the plurality of doorways relative to the first doorway is retrieved. At step 306, based upon the determined current orientation and the retrieved stored information, a movement is determined for positioning the second tunnel section adjacent to the second doorway. At step 308 the determined movement is performed in an automated fashion, so as to position the second tunnel section adjacent to the second doorway.

Figure 4:
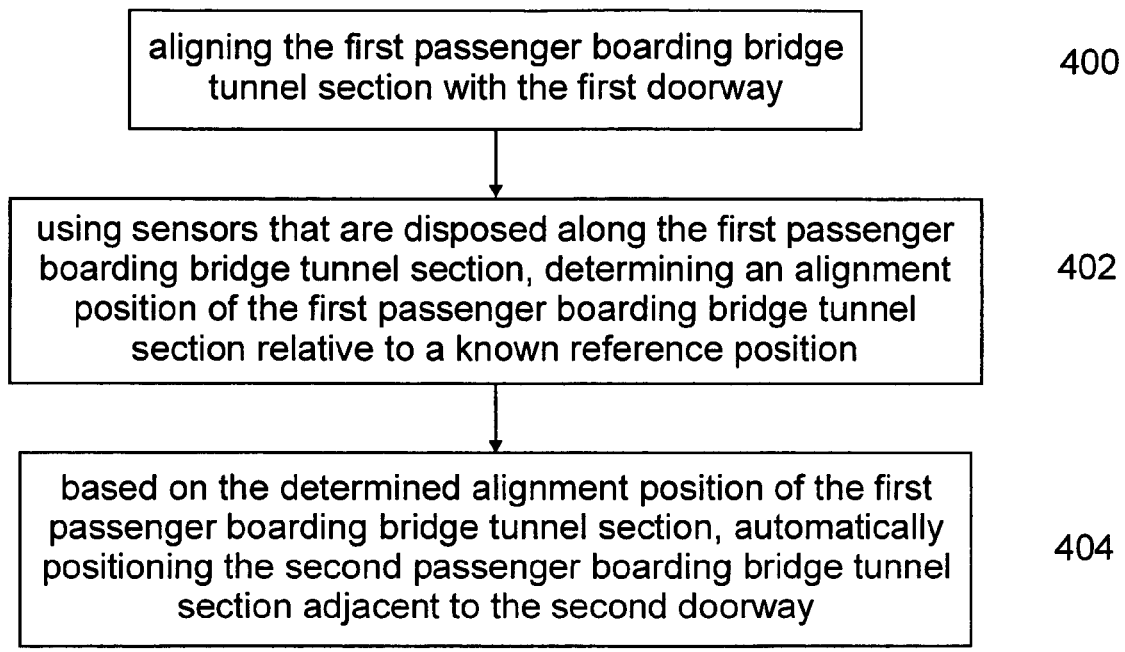

Referring now to FIG. 4, shown is a simplified flow diagram of yet another method for aligning a plurality of passenger boarding bridge tunnel sections with a plurality of doorways of an aircraft. At step 400 the first passenger boarding bridge tunnel section is aligned with the first doorway. At step 402, using sensors that are disposed along the first passenger boarding bridge tunnel section, an alignment position of the first passenger boarding bridge tunnel section is determined relative to a known reference position. At step 404, based on the determined alignment position of the first passenger boarding bridge tunnel section, the second passenger boarding bridge tunnel section is automatically positioned adjacent to the second doorway.

Of course, each one of the first passenger boarding bridge tunnel section and the second passenger boarding bridge tunnel section avoids a collision with the aircraft, independently of the orientation information that is communicated between the tunnel sections. In other words, once the first passenger boarding bridge tunnel section is aligned with a doorway of the aircraft, the second passenger boarding bridge tunnel section is subsequently aligned only if the alignment operation is possible and safe to perform. Various conditions such as for instance misalignment of the aircraft within the parking space, ground service equipment in the way, etc. may prevent the second passenger boarding bridge tunnel section from aligning successfully. To this end, preferably each passenger boarding bridge tunnel section includes sensors for sensing close approach to the aircraft, to ground service equipment, etc. Examples of suitable sensors include digital still or digital video cameras, laser range finders, inductive proximity sensors, pressure sensors, echo sonography sensors, etc. In addition, various combinations of the different sensor types also are envisaged.

Numerous other embodiments may be envisaged without departing from the spirit and scope of the invention.

What is claimed is:

1. A method for aligning a first passenger boarding bridge tunnel section with a first doorway of an aircraft and for aligning a second passenger boarding bridge tunnel section with a second doorway of the aircraft, the method comprising:

providing a controller in communication with the first passenger boarding bridge tunnel section, with the second passenger boarding bridge tunnel section, and with a memory element having stored therein information relating to a location of the second doorway relative to the first doorway;

using the controller, automatically aligning the first passenger boarding bridge tunnel section with the first doorway;

determining a current orientation of the second passenger boarding bridge tunnel section relative to the aligned first passenger boarding bridge tunnel section;

retrieving the information relating to the location of the second doorway relative to the first doorway;

based upon the determined current orientation and the retrieved information, determining a movement for aligning the second passenger boarding bridge tunnel section with the second doorway; and, using the controller, automatically performing the determined movement, so as to align the second passenger boarding bridge tunnel section with the second doorway.

2. A method according to claim 1, wherein the information contained in the memory element includes different information for each of a plurality of different aircraft sub-types.

3. A method according to claim 2, comprising identifying a sub-type of the aircraft and wherein retrieving the information comprises retrieving information that is specific to the identified sub-type of the aircraft.

4. A method according to claim 3, comprising pre-positioning the second passenger boarding bridge tunnel section from a stowed position to a position that is proximate an expected stopping location of the second doorway for the identified sub-type of the aircraft.

5. A method according to claim 4, wherein pre-positioning is performed prior to determining the current orientation of the second passenger boarding bridge tunnel section relative to the aligned first passenger boarding bridge tunnel section.

6. A method according to claim 1, wherein automatically performing the determined movement comprises sensing a distance between the second passenger boarding bridge tunnel section and a surface of the aircraft.

7. A method according to claim 6, comprising comparing the sensed distance to an expected distance for the determined movement, the expected distance relating to a minimum safe distance between the second passenger boarding bridge tunnel section and the surface of the aircraft.

8. A method according to claim 7, comprising aborting the determined movement if the sensed distance is less than the expected distance.

9. A method according to claim 1, wherein the first doorway is a doorway that is forward of a wing of the aircraft.

10. A method according to claim 9, wherein the second doorway is a different doorway that is forward of the wing of the aircraft.

11. A method according to claim 9, wherein the second doorway is a doorway that is aft of the wing of the aircraft.

12. A method according to claim 9, wherein the second doorway is a doorway that is aligned with and above the wing of the aircraft.

13. A method according to claim 1, wherein the first doorway is disposed along a first side of the aircraft and wherein the second doorway is disposed along a second side of the aircraft, the second side opposite the first side.

14. A method for aligning in a one-to-one fashion, a plurality of passenger boarding bridge tunnel sections with a plurality of doorways of an aircraft, the method comprising:
   aligning a first tunnel section of the plurality of passenger boarding bridge tunnel sections with a first doorway of the plurality of doorways;
   determining a current orientation of a second tunnel section of the plurality of passenger boarding bridge tunnel sections relative to the aligned first tunnel section;
   retrieving stored information relating to a location of a second doorway of the plurality of doorways relative to the first doorway;
   based upon the determined current orientation and the retrieved stored information, determining a movement for positioning the second tunnel section adjacent to the second doorway; and,
   performing the determined movement in an automated fashion, so as to position the second tunnel section adjacent to the second doorway.

15. A method according to claim 14, comprising storing information relating to a location of the second doorway of the plurality of doorways relative to the first doorway of the plurality of doorways.

16. A method according to claim 15, wherein storing information comprises storing different information that is specific for each of a plurality of different aircraft sub-types.

17. A method according to claim 16, comprising identifying a sub-type of the aircraft, and wherein retrieving stored information comprises retrieving stored information that is specific to the identified sub-type of the aircraft.

18. A method according to claim 17, comprising pre-positioning the second tunnel section from a stowed position to a position that is proximate an expected stopping location of the second doorway for the identified sub-type of the aircraft.

19. A method according to claim 18, wherein the second tunnel section is pre-positioned prior to determining the current orientation of the second tunnel section relative to the aligned first tunnel section.

20. A method according to claim 14, wherein performing the determined movement in an automated fashion comprises sensing a distance between the second tunnel section and a surface of the aircraft.

21. A method according to claim 20, comprising comparing the sensed distance to an expected distance for the determined movement, the expected distance relating to a minimum safe distance between the second tunnel section and the surface of the aircraft.

22. A method according to claim 21, comprising aborting the determined movement if the sensed distance is less than the expected distance.

23. A method according to claim 14, wherein the first doorway is a doorway that is forward of a wing of the aircraft.

24. A method according to claim 23, wherein the second doorway is a different doorway that is forward of the wing of the aircraft.

25. A method according to claim 23, wherein the second doorway is a doorway that is aft of the wing of the aircraft.

26. A method according to claim 23, wherein the second doorway is a doorway that is aligned with and above the wing of the aircraft.

27. A method according to claim 14, wherein aligning the first tunnel section is performed in one of a manual, semi-automated and automated fashion.

28. A method according to claim 14, wherein performing the determined movement comprises moving the second tunnel section into an aircraft-engaging condition, such that the second tunnel section is aligned with the second doorway for supporting passenger transfer therebetween.

29. A method according to claim 14, wherein performing the determined movement is for moving an aircraft-engaging end of the second tunnel section to an intermediate position that is spaced-apart from the aircraft and adjacent to the second doorway.

30. A method according to claim 29, comprising moving the second tunnel section from the intermediate position into an aircraft engaging condition, such that the second tunnel section is aligned with the second doorway for supporting passenger transfer therebetween.

31. A method according to claim 30, wherein moving the second tunnel section from the intermediate position into the aircraft engaging condition is performed in an automated fashion.

32. A method according to claim 30, wherein moving the second tunnel section from the intermediate position into the aircraft engaging condition is performed in a manual fashion.

33. A method according to claim 30, wherein moving the second tunnel section from the intermediate position into the aircraft engaging condition comprises moving the second tunnel section less than 3 meters along a direction toward the aircraft.

34. A method according to claim 30, wherein moving the second tunnel section from the intermediate position into the aircraft engaging condition comprises moving the second tunnel section less than 1 meter along a direction toward the aircraft.

35. A method according to claim 30, wherein moving the second tunnel section from the intermediate position into the aircraft engaging condition comprises moving the second tunnel section less than 0.5 meters along a direction toward the aircraft.

36. A method according to claim 14, wherein the first doorway is disposed along a first side of the aircraft and wherein the second doorway is disposed along a second side of the aircraft, the second side opposite the first side.

* * * * *